July 10, 1956
R. J. TRAINOR
2,753,904
FRUIT JUICE EXTRACTING DEVICE
Filed Nov. 1, 1951
4 Sheets-Sheet 1
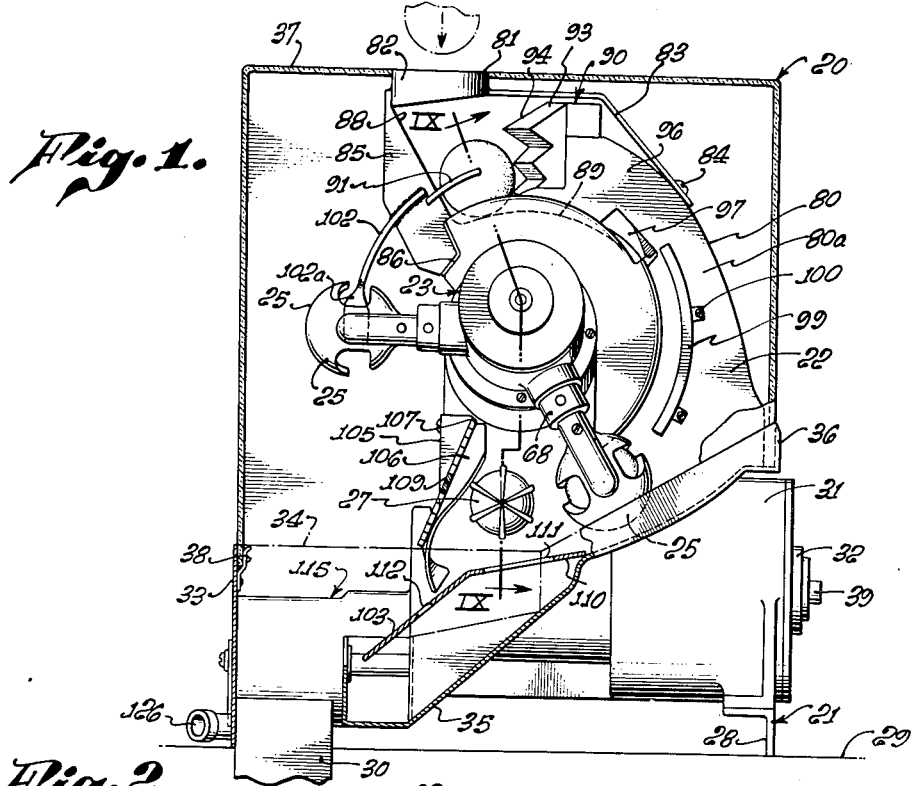
Fig. 1.
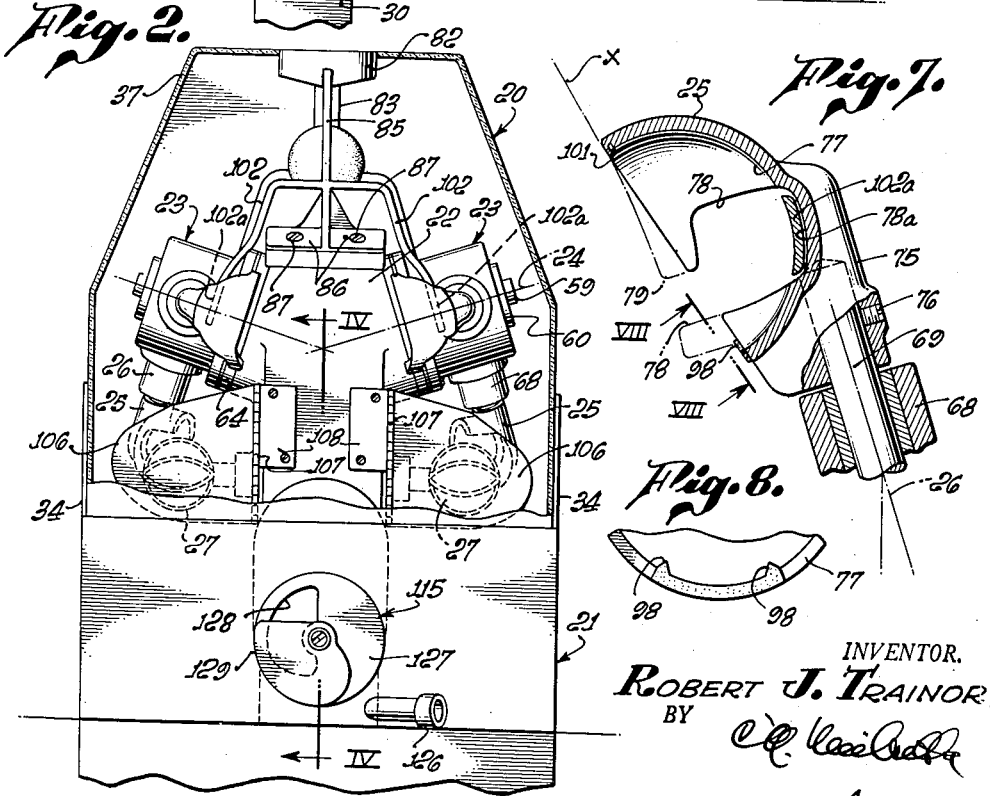
Fig. 2.
Fig. 7.
Fig. 8.
INVENTOR.
ROBERT J. TRAINOR,
BY
ATTORNEY.

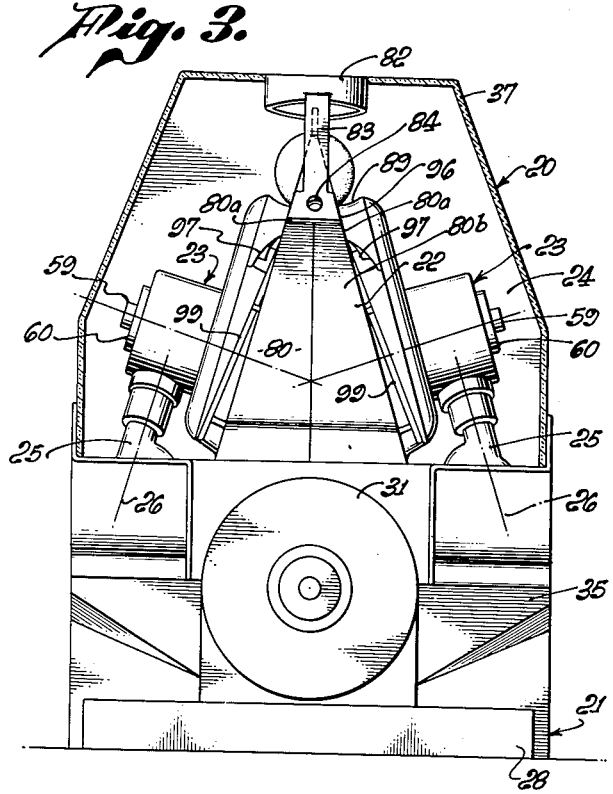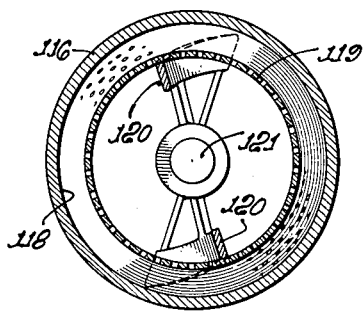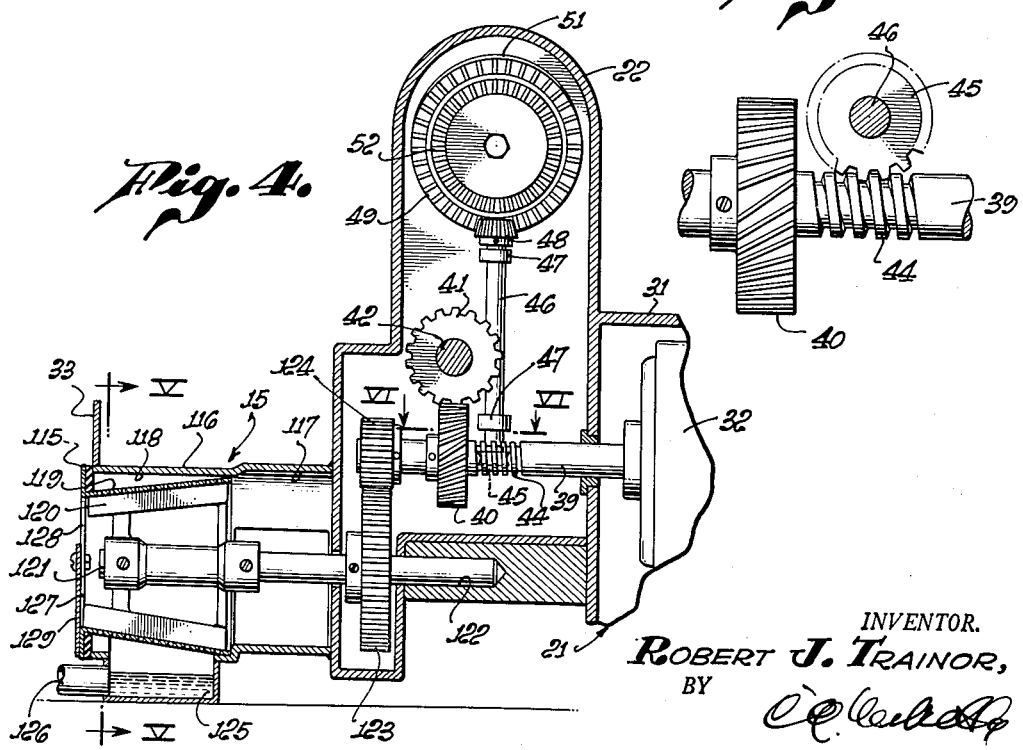

July 10, 1956 R. J. TRAINOR 2,753,904
FRUIT JUICE EXTRACTING DEVICE
Filed Nov. 1, 1951 4 Sheets-Sheet 3
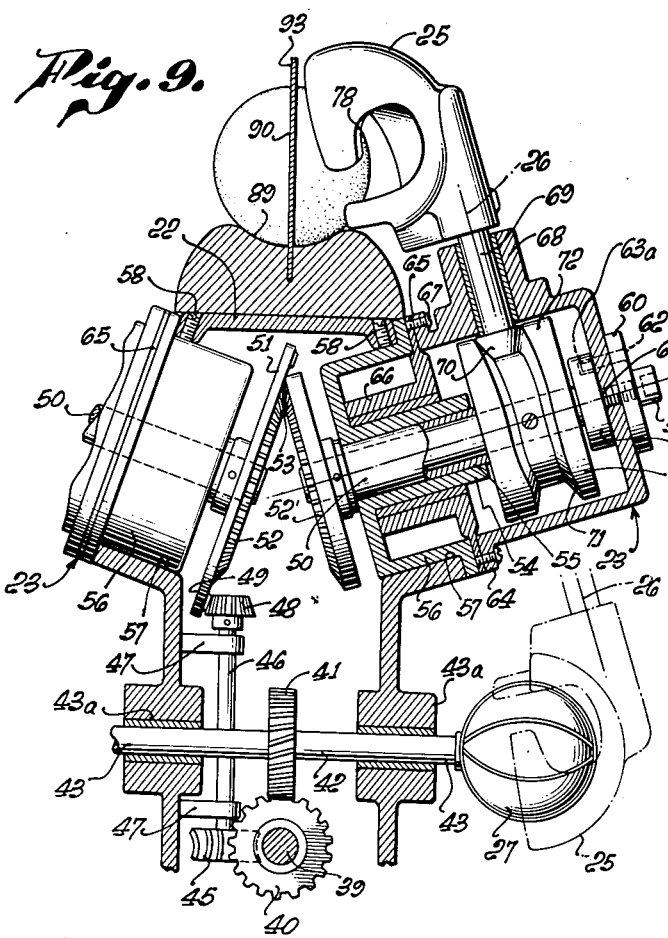
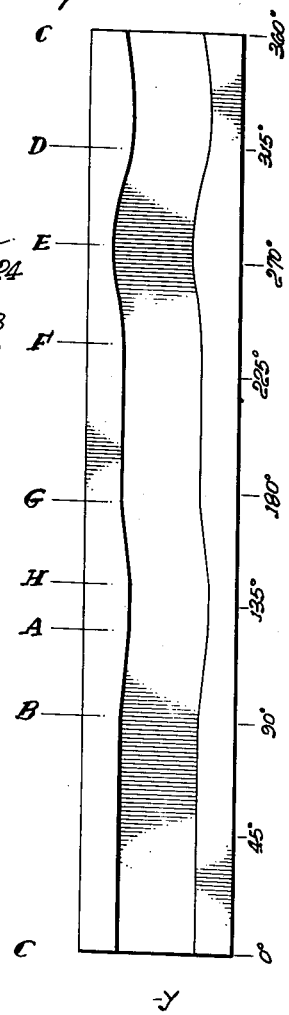
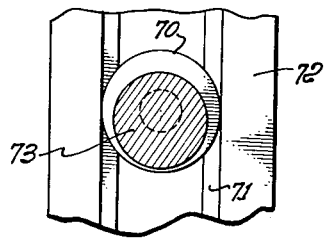
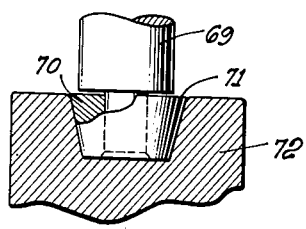
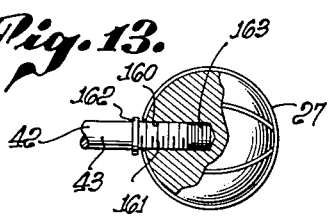
INVENTOR.
ROBERT J. TRAINOR,
BY
ATTORNEY.

July 10, 1956  R. J. TRAINOR  2,753,904
FRUIT JUICE EXTRACTING DEVICE
Filed Nov. 1, 1951  4 Sheets-Sheet 4
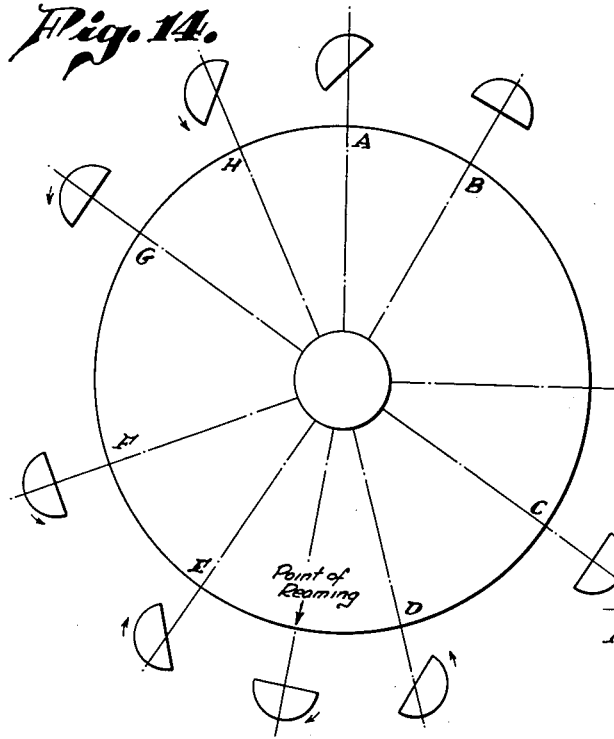
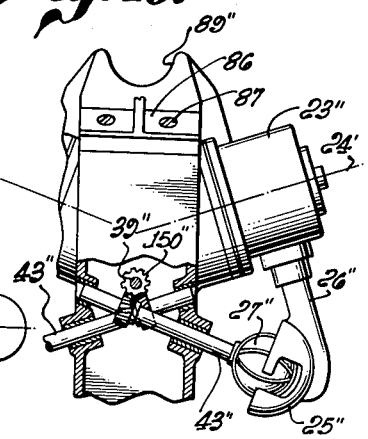
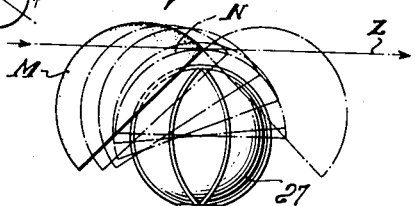
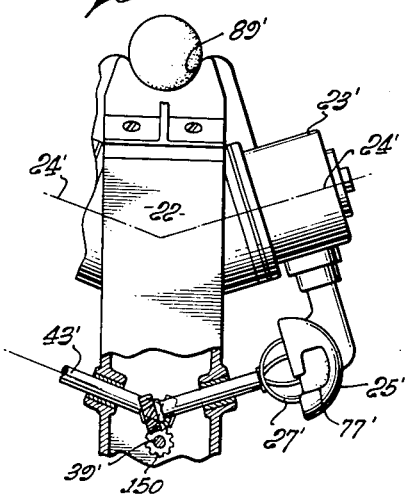
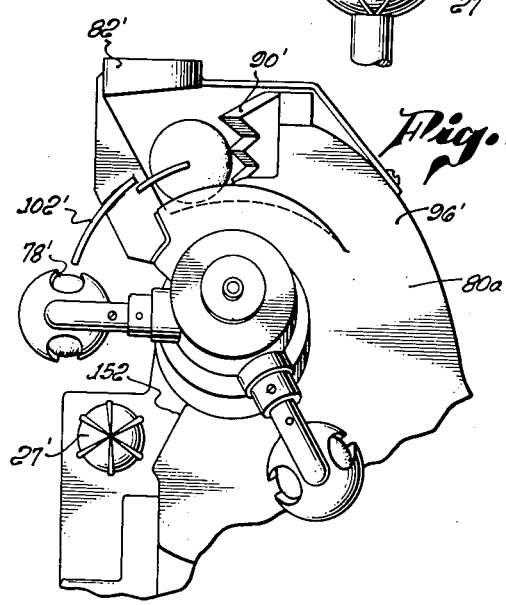
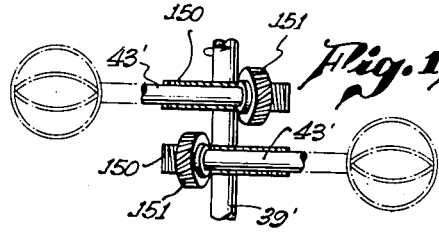
INVENTOR.
ROBERT J. TRAINOR,
BY
ATTORNEY.

United States Patent Office 2,753,904
Patented July 10, 1956

2,753,904

FRUIT JUICE EXTRACTING DEVICE

Robert J. Trainor, West Covina, Calif., assignor to N. Spencer Dennis

Application November 1, 1951, Serial No. 254,401

16 Claims. (Cl. 146—3)

This invention relates to an improved fruit juice extracting device and more particularly to a novel compact arrangement of a reamer and a fruit holder for extracting juice from citrus fruit.

Prior proposed juice extracting devices included a hemispherical reamer rotatable about a radial axis lying perpendicular to the flat back face of the hemisphere. Halves of citrus fruit are usually pressed against the hemispherical reamer in a direction along its axis of rotation for suqeezing and extracting juice from the fruit. Such a basic arrangement of a reamer and a fruit holder has been varied in many ways, as for example, the provision of rotatable means adapted to carry a plurality of such reamers and other rotatable means for fruit holders, said means being cooperable to bring a reamer and holder into juice extracting or reaming position. These prior devices were relatively large, of heavy construction, cumbersome, difficult to clean, and expensive. They were principally used for the commercial extraction of fruit juice under conditions wherein it was believed to be desirable and economical to extract a large quantity of juice and then to hold the juice in storage for a period of time before use.

Such prior extracting devices were not adapted nor designed for the extraction of, and sale of fresh fruit juices in restaurants, drugstores, cafeterias, and the like. The prior devices were not suitable for installation on a counter in a drugstore or restaurant, nor did they present a suitable appearance for display for advertising and promotion of the sale of fresh fruit juice. While some prior devices were displayed for the purpose of promoting interest in the sale of fresh fruit juice, such prior devices known to me were so designed that the window of transparent material housing the extracting device was soon covered with juice and particles of pulp which resulted in an unattractive and unclean appearance. Further, the reaming arrangement of some prior proposed extracting devices required a power supply of at least 220 volts which is generally not supplied to restaurants, drugstores, cafeterias, and the like. Installation of such prior devices thus required rewiring and the exercise of additional precautions in the operation of the device as required by building codes and city ordinances.

It is well known that fresh fruit juice, that is juice extracted and at once consumed, is more beneficial than fruit juice which has been stored or kept for even a few hours. Fruit juice which is not consumed immediately after extraction from the fruit not only loses its taste and palatability, but also begins to lose its vitamin content. None of the prior proposed juice extracting devices have been relatively small, compact, attractive, and of a size such that they are capable of efficiently and economically extracting and making available fruit juices in sufficient quantity on demand for immediate consumption. Manual extraction of fruit juices from fruit is too slow and costly; and the prior proposed extracting devices are not economical nor designed for sale of fresh fruit juice at a restaurant and drugstore level.

The fruit extracting device of the present invention contemplates a novel arrangement of spherical reamers, each cooperable with one or more fruit holders continuously rotating in a circular path at a virtually constant rate of speed, such rotary type of extracting device being more efficient than devices of the reciprocating or intermittent type. The extracting device of this invention may be compactly constructed for extracting fruit juices in quantity for immediate consumption in an efficient and economic manner and utilizing normally available power supply, such as 110 volts. The invention contemplates that at least two cooperative fruit holders continuously travel in circular paths or orbits about primary axes which are inclined to each other and lie in the same plane. Each holder is also rotatable about a secondary axis which is radial to the primary axis affording the center of the circular path of the holder. The orbit of each holder passes adjacent to but not into or through a perpendicular plane bisecting the angle defined between the inclined axes. At the closest point of adjacency in their circular paths, the two holders cooperate to receive a whole fruit and to hold said fruit during cutting thereof half in two by a knife blade lying in said bisecting plane. At another portion of their orbits, each holder is actuated for rotation in a partial circle about the secondary axis for presenting the cut face of the fruit to a spherical reamer in several continuous sequential positions for pressing and wiping the fruit against and over said reamer. Each spherical reamer is mounted for rotation about an axis which lies in angular relation to the secondary axis or to the inclined plane of the orbit of the holder.

The particular motion of the fruit holder about the secondary axis while traveling in its circular orbit is controlled by novel cam means carried adjacent the primary axis. The novel cam means comprises a stationary cylinder cam having a groove therein forming a selected path for a follower mounted eccentrically on the end of a selectively rotatable spindle. The spindle is journaled to follow a fixed path lying in a plane perpendicular to the axis of the cylinder cam, while the eccentrically mounted follower travels in the path of the groove to produce a selected turning movement of the spindle about its axis which forms the secondary axis. Various movements of the fruit holders about their secondary axes position the holders so that a fruit cutting operation, a juice extracting operation, and a skin removal operation are automatically performed while the fruit holders rotate at a substantially constant rate of speed about the primary axis.

The primary object of this invention is to design and provide a fruit juice extracting device wherein a reamer and a fruit holder are arranged for cooperation in novel fashion.

It is an important object of this invention to provide novel cooperative action of the fruit holder and a spherical reamer wherein the holder moves in a path about the reamer so that a smooth uniform wiping action of the reamer with the fruit extracts a maximum of high quality juice without contamination by oil from the skin of the fruit.

An object of this invention is to design and provide novel cam means for accurately and precisely controlling the movement of the holder about the reamer to accomplish such maximum uncontaminated extraction of juice.

An object of this invention is to design and provide a fruit juice extracting device which is capable of quickly extracting juice from fruit fed to the device in a clean, efficient, and economic manner.

Another object of this invention is to design and provide a fruit juice extracting device of compact design and inexpensive manufacture which is adaptable for a display upon a counter in a restaurant, drugstore, and the like.

A further object of this invention is to design and provide a fruit juice extracting device wherein fruit holders are rotatable about a primary axis at a constant rate of speed and rotatable about a secondary axis in accordance with a preselected controlled varying movement for performing the several operations described above to a fruit.

A further object of this invention is to design and provide a device such as described above wherein spherical reamers are employed in novel manner for cooperation with a fruit holder.

Still another object of this invention is to provide an extracting device as described above wherein spherical reamers may be arranged for rotation about axes which lie in spaced-apart different planes for staggering the load of the reaming operation on the driving motor means.

Still another object of this invention is to provide such an extracting device wherein means are provided for deflecting juices extracted from a fruit so that splattering of the juices during the reaming operation is confined to selected areas.

A still further object of this invention is to provide a juice extractor as above described wherein means are provided for separating the skins of the fruit from the extracted juice and collecting said skins in a suitable receptacle.

A still further object of this invention is to provide an extractor device as described above with means for holding a half fruit within a fruit holder during a portion of the circular path of the holder and for ejecting the skin of the fruit after the reaming operation.

Another object of this invention is to design and provide a juice extracting device having spherical reamers and cooperative fruit holders arranged in novel manner so that the several operations of cutting, extracting, and ejecting are conducted in such a sequential manner that a relatively low power supply and fractional horsepower motor may be employed to drive the device.

Generally speaking, this invention contemplates a small, compact, easily accessible fruit juice extracting device operable from a low power supply for performing necessary operations to extract and provide with maximum yield a finished noncontaminated fruit juice from whole fruit received by the device.

Other objects and advantages of this invention will be readily apparent from the following description of the drawings.

In the drawings:

Fig. 1 is a side elevation, partly in section, of a fruit juice extracting device embodying this invention.

Fig. 2 is a front view, partly in section, taken from the left of the device shown in Fig. 1.

Fig. 3 is a back view taken from the right of the device shown in Fig. 1.

Fig. 4 is a fragmentary sectional view taken in a vertical plane bisecting the device as indicated by line IV—IV of Fig. 2.

Fig. 5 is a sectional view taken in the plane indicated by line V—V of Fig. 4.

Fig. 6 is a fragmentary enlarged view of a gear arrangement in the device shown in Fig. 1 as viewed from the plane indicated by line VI—VI of Fig. 4.

Fig. 7 is an enlarged sectional view, partly in section, of a fruit holder employed with the device shown in Fig. 1.

Fig. 8 is a fragmentary view of a portion of the fruit holder as viewed from a plane indicated by line VIII—VIII of Fig. 7.

Fig. 9 is a fragmentary sectional view taken in the plane indicated by the line IX—IX of Fig. 1.

Fig. 10 is an enlarged fragmentary view of a cylinder cam and a cam follower illustrated in Fig. 9.

Fig. 11 is a sectional view taken in a radial plane passing through the cylinder cam and partially through the cam follower.

Fig. 12 is a diagrammatic plan view of the face of the cylinder cam projected into a plane, the length of the cam plan being equivalent to 360°.

Fig. 13 is a fragmentary partially sectional view of the threaded mounting of a reamer on a reamer shaft portion.

Fig. 14 is a diagrammatic view illustrating the circular path of a fruit holder and the various critical positions assumed by the fruit holder with respect to the plane of the circular path, the fruit holder being viewed as if looking along the plane of the circular path.

Fig. 15 is a diagrammatic view showing several positions of the fruit holder during a reaming operation.

Fig. 16 is a fragmentary view of a modification of the device shown in Fig. 1.

Fig. 17 is a fragmentary diagrammatic view taken in a horizontal plane through Fig. 16 of a modified arrangement of the reamer shafts.

Fig. 18 is a fragmentary side view of the modification shown in Fig. 16.

Fig. 19 is a fragmentary view of a different modification of this invention.

In the embodiment of this invention illustrated in Figs. 1 to 15, inclusive, a fruit juice extracting device generally indicated at 20 may comprise a base 21, an upstanding hollow housing 22, and a pair of turret heads 23 carried on opposite sides of said housing and rotatable about oppositely inclined primary axes 24. Each turret head 23 may carry one or more fruit holders 25 which are adapted to be selectively rotated about secondary axes 26 radially arranged to a primary axis. Each fruit holder 25 is thus rotatable about a primary axis 24 in a circular path lying in an inclined plane and is also selectively rotatable about a secondary axis 26. A rotatable spherical ribbed reamer 27 is positioned in proximity to a lower portion of the circular path of the fruit holders on each side of the housing so as to cooperate with a holder in a specific manner as described hereafter for efficiently reaming juice from a half fruit carried by a holder.

The base 21 may comprise suitably arranged angle iron members 28 adapted to support housing 22. Normally, the device is positioned adjacent to an edge of a counter table, or flat surface 29 with its front end slightly overhanging the edge so as to conveniently arrange a receptacle 30 for collecting and receiving fruit skins.

The metal housing 22 may be preferably cast and includes a rearwardly extending portion 31 enclosing a motor 32. Surrounding the lower portion of the housing may be an upstanding enclosure formed by a front wall 33, side walls 34, and a partially downwardly inclined bottom wall 35. The side walls 34 may be connected by a back wall 36 lying above motor portion 31 of the casing.

A transparent cover 37 of any suitable cross-section may be superimposed over the upper portion of housing 22 and the lower margins of the cover may be received within the walls 33, 34, and 36 and supported by suitably spaced clips 38. Preferably, the cover 37 may be made of any suitable transparent material as, for example, a clear transparent plastic material or glass.

To facilitate understanding of the compact structure and operation of the fruit juice extracting device, the driving means for rotating the turret heads, fruit holders, and reamers will first be described.

The driving means for the device may comprise the motor 32 having a horizontal motor shaft 39. The motor shaft 39 carries adjacent to its end a vertically disposed helical gear 40 having meshed engagement with a transversely arranged helical gear 41 which is carried by a horizontal transverse reamer shaft 42. The reamer shaft 42 includes outwardly extending shaft portions 43 journaled in bearings as at 43a and each carries at its extremity a spherical reamer 27 rotatable therewith.

The spherical reamer may be provided with a threaded bore 160 for receiving the threaded end 161 of the shaft portion 43 (Fig. 13). The reamer is normally threaded thereon until it seats against a collar 162. To provide adjustment axially of the shaft portion for properly spacing the surface of the reamer with respect to the interior surface of the fruit holder for accommodating citrus fruit of different type and thickness of skin or peel, shim washers 163 may be positioned between the end of the bore and the end of the shaft portion. If desired, shim washers may be seated against the collar between the collar and the reamer.

Adjacent to the transverse helical gear 41, the motor shaft 39 is provided with a worm threaded portion 44 for meshed engagement with a gear 45 carried by a vertical shaft 46 having an axis lying to one side of the axis of the motor shaft. The shaft 46 may be journaled in spaced ears 47 projecting inwardly from the inner surface of the side wall of casing 22. At its upper end, shaft 46 carries a bevel gear 48 for engagement with an outer ring gear 49 carried by one of two inclined primary shafts 50, the axis of each forming a primary axis 24. The outer gear 49 is formed on a circular plate 51 which carries an inner bevel gear 52 which engages as at 53 teeth of a corresponding bevel gear 52'. The gear 52' is carried by shaft 50 oppositely inclined to the first-mentioned shaft 50. Each shaft 50 is thus rotated at virtually the same rate of speed.

For purposes of clarity, the details of the drive structure on only one side of the device is shown and described inasmuch as the driving structure on the opposite side is virtually identical.

Each shaft 50 may be journaled in a sleeve portion 54, having an internal bushing 55, and formed integral with a flanged cylindrical member 56 which may seat upon circumferential edge margins of an opening 57 in the side of casing 22. Member 56 may be secured in opening 57 by screws 58.

Mounted on the outer portion of each primary shaft 50 is turret head 23 of generally hollow cylindrical form. The turret head 23 may be secured to the end of shaft 50 by an axial bolt 59 extending through an outer washer 60 for threaded engagement with the shaft and with the end walls of the turret head 23 as at 61. The end of each shaft 50 may be provided with an annular headed portion 63 affording a seat for the end wall of turret head 23. The washer 60 carries a locating pin 62 which extends through the end wall of turret head 23 for reception within a close fitting bore 63a in headed portion 63. The interlocking of the pin 62 with the head portion not only locates the turret head accurately with respect to the opposite turret head but also restrains turret head 23 from turning on shaft 50.

Each turret head 23 is provided with an outwardly extending peripheral annular flange 64 for seating against a flange portion 65 of a bearing sleeve 66 which is journaled over sleeve portion 54 of member 56. Circumferentially spaced screw bolts 67 may secure the head to portion 65 of the bearing sleeve 66.

Each turret head 23 may be provided with one or more circumferentially arranged hollow bosses 68 for journably mounting therein a secondary shaft or spindle 69 having its axis forming the secondary axis 26. The spindle 69 lies and travels in an inclined plane perpendicular to the primary axis and is radially arranged with respect thereto.

Cam means for selectively turning the spindle 69 and a holder 25 attached thereto while the holder rotates about the primary axis include a frustoconical shaped cam follower 70 eccentrically mounted on the inner end of spindle 69 with respect to the secondary axis and a non-rotatable stationary cylindrical cam member 72 mounted coaxial with the primary axis on bushings carried on shaft 50. The cylindrical surface of the cam member 72 is provided with a groove 71 of uniform width and having inclined side wall corresponding to the taper of the follower 70.

The path of the groove 71 on the cylindrical surface is best seen diagrammatically in Fig. 12, wherein the cylindrical surface and groove have been unrolled from cylindrical form and extended into flat form. The length of the groove shown is equivalent to 360°. The reference line Y represents the intersection with the cam member 72 of the inclined plane in which the secondary axis travels. On the left side of Fig. 12 are letters indicating and correlating various positions of a holder in its circular path as seen diagrammatically in Fig. 14 with respect to the cam groove 71.

The path of groove 71 will be seen to straddle reference line Y in varying relation throughout its length. The path of the groove is such that the fruit holder is selectively turned at various positions in its circular path to accomplish the several operations to be performed by the device. Since the cam follower is eccentrically carried on spindle 69 when the path of the groove swerves to one side or the other of line Y, spindle 69 is correspondingly rotated and the position of holder 25 with respect to the plane of its circular path is accordingly modified.

The details of the fruit holder 25 are best seen in Fig. 7. Each fruit holder 25 includes a spindle-receiving portion 75 into which the outer end of the spindle 69 extends and may be held as by a set screw 76. Integrally formed with the spindle receiving portion 75 is a generally hemispherical hollow cup-shaped fruit carrying portion 77, the secondary axis 26 of the spindle 69 passing tangentially through a point on the inner surface of the fruit carrying portion 77. The polar axis of the hemispherical portion 77 may be at a slight angle to a plane perpendicular to the secondary axis at the point of tangency of the secondary axis with the portion 77. The plane of the open face of portion 77, indicated at X, Fig. 7, lies at an angle to axis 26 for the purpose of positioning the fruit carrying portion 77 in perpendicular relation to the axis of the reamer shaft at one instant during a reaming operation.

The curved walls of portion 77 are provided with suitably configured oppositely arranged slots 78 for reception and passage therethrough of a fruit skin or peel ejector means as later described. Each slot 78 terminates in a shallow recess or groove 78a formed in the inner surface of the fruit carrying portion to permit passage of peel ejector means therethrough behind a fruit skin for positive ejection thereof and for preventing crowding or mashing of the fruit skin against the trailing wall portion of the holder. The trailer wall portion of holder 25 is preferably provided with an extended lip 79 for positively engaging a whole fruit when the fruit is first picked up and carried against a cutting means.

A somewhat triangular-shaped hood 80 partially covers a top portion of housing 22 and motor portion 31 and may be secured thereto in suitable manner. If desired, hood 80 may be integrally formed with housing 22. Hood 80 includes downwardly and outwardly sloping side walls 80a lying virtually parallel to the inclined planes of the circular paths of holders 25. Side walls 80a are connected by a triangular back wall 80b and merge at the front to provide a shallow groove 89 curved in virtual conformity with the circular path of the holders 25.

Means for receiving whole fruit by the device are best shown in Figs. 1, 2, and 3. The top wall 37 of the transparent cover 20 may be provided with a circular port 81 which receives upper marginal portions of a relatively short sleeve 82. The sleeve 82 is carried by a rearwardly-extending bar 83 suitably bent downwardly for connection to the back wall of the hood 80 as by a screw 84. A forward support member 85 may be suitably connected to sleeve 82 as by welding and to the forward portion of the hood 80 and housing 22 as by oppositely directed feet 86 through which extend securing screws 87. The support member 85 lies in a vertical plane which virtually bisects the angle formed by the oppositely inclined primary axes 24. The support member 85 has an inclined rearwardly-facing edge 88 which serves to guide a fruit rearwardly to a position of rest in shallow groove 89 immediately in front of the cutting means generally indicated at 90. A whole fruit is further steadied in this position by means of rearwardly, slightly upwardly-extending arcuate arms 91 carried by support member 85, said arms partially embracing the fruit. Fruit thus dropped by gravity through sleeve 82 will be positioned for pickup by cooperative fruit holders 25. The space between the lower edge of sleeve 82 and arcuate arms 91 may be such that whole fruit may be vertically stacked for automatic gravity feed through sleeve 82.

The means for cutting a whole fruit into two virtually equal halves, has been indicated at 99. The cutting means 90 comprises a knife blade 93 vertically disposed in the vertical plane bisecting the angle formed by the oppositely inclined primary axes. The blade 93 is provided with a forwardly-extending knife edge 94 of zigzag configuration for facilitating cutting of a whole fruit in two.

In operation, cooperative fruit holders 25, each traveling in a circular path on each side of the device, come into proximity with each other for picking up and grasping a whole fruit positioned between the arcuate arms 91. To make this pickup, each fruit holder is turned about the secondary axis 26 by the cam means into slightly opened, rearwardly-facing direction as indicated in Fig. 14 as position A. As two cooperative fruit holders 25 embrace a whole fruit, the cam means turns the holders slightly inwardly and toward each other so as to securely grasp and hold the whole fruit as it is carried rearwardly against the knife edge 94 for cutting.

When the whole fruit has been cut into halves and is in a position past knife edge 94, each half fruit is substantially received within a fruit holder 25. An inclined downwardly curved surface 96 on side walls 80a of hood 80 merge smoothly with the blade 93 for guiding and holding the half fruit in the holder. The shallow groove 89 terminates slightly behind the knife blade 93 and adjacent to such termination a curved element 97 slopes outwardly from surface 96. The element 97 acts to urge the half fruit further within the fruit holder beyond the circumferential edge of the fruit receiving portion 77. The lower margins of the fruit are pressed by element 97 over a pair of spaced radially, inwardly-extending, resilient fingers 98 carried on the edge of receiving portion 77. The resilient fingers 98 spring back to normal position after the fruit has passed thereon and prevent the lower portion of the fruit from slipping out of holder 25.

As the fruit holder progresses further in its circular path, an arcuate curved member 99 rises above the surface 96 to which it may be secured as by screws 100. The arcuate member 99 is aligned with slots 78 in the fruit holder so that the half fruit is further pressed against the inner surface of the fruit receiving portion and the upper margin of a half fruit is pressed behind a rigid radially, inwardly-extending pin 101. Thus, the half fruit is securely held within the fruit receiving portion 77 during its advancement from the knife blade to the reamer 27.

In this portion of the circular path of the fruit holder, the plane of the open face of the fruit receiving portion 77 lies substantially parallel to the surface 96 or parallel to the inclined plane defined by the secondary axis 26 in its rotation about the primary axis. The several positions of the fruit holder are indicated in Fig. 14 from B to C.

As the fruit holder approaches reamer 27, the cam means turns the face of the fruit holder into the direction of advancement for facing the holder to the spherical reamer 27 at an angle of approximately 45°. At the beginning of this movement, the fruit holder has passed beyond the lower edge of surface 96 on hood 80 and the half fruit is held by resilient fingers 98 and pin 101 within the fruit receiving portion 77. The fruit holder approaches the reamer in such angular facing relation and as contact is made by the reamer with the cut flat face of the fruit, the cam means begins to smoothly turn the fruit holder in a curved path about the spherical reamer.

The path of travel of fruit holder 25 during the reaming operation is best shown in Figs. 14 and 15. The axis 26 of the spindle is illustrated as traveling in a plane indicated by straight line Z, Fig. 15. The rate of angular change of the holder about axis 26 varies from the first instant of reaming contact with the fruit to the last instant of withdrawal of the holder from the reamer. In Fig. 15, the initial position of the reamer is shown at M. Between the initial position and the center position at N, where the holder is perpendicularly arranged with respect to the reamer, the holder is selectively rotated about axis 26 in the following manner.

During the first portion of the reaming operation, the rate of angular change of the holder about axis 26 is relatively slow with the result that the reamer is gradually urged into the half fruit until a substantial and major portion of the spherical surfaces opposed to the face of the fruit is in contact with the fruit. As the holder continues to advance in its circular path at a constant rate, the rate of angular rotation of the holder about axis 26 smoothly and gradually increases so that the portion of the circular path traveled by the holder just before reaching its mid position is provided with a relatively rapid rate of angular change. The gradual selected increase of the rate of angular change of the holder about axis 26 is such that the surface of the reamer is maintained in selected spaced relation to the inner surface of the fruit carrying portion and thus to the inner surface of the peel. Contact of the reamer with the peel is thus positively avoided, extraction of oil therefrom substantially prevented, and a maximum extraction of noncontaminated fruit juice is provided.

From mid position at N to the final withdrawal position at O the rate of angular change of the holder about axis 26 decreases in the reverse manner of that just described with respect to the approach of the fruit holder to the reamer. Such accurately controlled rotation of the holder about the reamer provides a smooth effective wiping action of the reamer with the portion of the fruit to be reamed. The constant rate of rotation of the holder in its circular path as it performs this reaming operation by rotation about its primary axis and the smooth gradual rate of increase and decrease of angular change of the holder about the secondary axis provides a reaming action which virtually uniformly loads the motor during this operation.

It should thus be noted that the particular selected path of the holder about the spherical reamer is such that a virtually concentric relation is quickly assumed and maintained by the holder and reamer for effectively utilizing a major portion of the spherical reamer. An efficient reaming operation is thus provided in which the fruit holder moves in uniformly spaced relation to the surface of the reamer for a substantial portion of its curved path about the reamer and does not hesitate in its circular path about the primary axis at the reaming position.

During the reaming operation the half fruit is held against rotation within the fruit receiving portion 77 by the pressure of the reamer against the fruit which causes outer portions of the skin of the fruit to be grasped by the edges of slots 78, such grasping preventing turning of the fruit skin within the holder.

After the reaming operation, the fruit skin is retained within the fruit receiving portion 77 by the grasping of the skin by the edges of slots 78. When the fruit holder has advanced to a virtually horizontal plane as indicated in Fig. 1, the cam means have returned the fruit holder into a position shown as "F" of Fig. 13 wherein the open face of the fruit holder again lies generally parallel to the inclined plane of the circular path of the holder. At this point, arcuate downwardly-extending ejector arms 102, with enlarged spoon type portions 102a carried by the support member 85 and aligned with the circular path followed by slots 78 serve to eject the fruit skin from the fruit holder by entering slots 78 and passing through groove 18a for passing behind the peel and positively ejecting the peel outwardly from the holder. The ejector action is such that crowding or crushing of the fruit peel against the trailing wall of the holder is effectively prevented. Ejected fruit skins fall upon downwardly inclined plates 103 which guide and direct the skins to a suitable receptacle 30 for collection thereof. The plates 103 maintain the ejected skins separate from the extracted juice to prevent contamination of the juice.

As the fruit holder advances upwardly towards the whole fruit receiving position, it is turned by the cam means into a position as at H (Fig. 13) to pick up another whole fruit for carrying the fruit through the cycle of operations described above.

Juice extracted from the fruit during the reaming operation is directed downwardly into a selected area by deflector means generally indicated at 105. The deflector means may comprise a suitably configured flat deflector plate 106 pivoted at 107 to a hinge plate 108 secured to the wall of the casing 22. The deflector plate 106 is spring biased by suitable spring means 109 into a front covering position over reamer 27. As the fruit holder passes over and around the spherical reamer 27, juice extracted from a half fruit is deflected downwardly upon striking the deflector plate 106. When the fruit holder has advanced beyond the reamer, the back of the holder strikes the deflector plate 106 and turns it about its pivotal mounting 107 to permit the fruit holder to slip thereby in its circular path of travel. When the fruit holder has passed, the deflector plate returns to its reamer covering position as shown in Fig. 1.

It is understood that the deflector means illustrated is exemplary only, and it is contemplated that a deflector plate may be actuated by a cam means carried by the fruit holder or by the primary shaft for causing actuation of the deflector plate into several positions as desired.

An intermediate apertured downwardly inclined plate 110 is positioned immediately below reamer 27 so only juice may pass through apertures 111 to the bottom wall 35. The plate 110 may be integrally formed with the previously mentioned plate 103, said plate 103 being formed with apertures 112 for flow of juice therethrough. Juice flowing along bottom wall 35 is conducted thereby to a juice-finishing means generally indicated at 115.

The juice-finishing means 115 is carried in front of the extractor device and comprises a generally cylindrical forwardly-extending housing 116 connected to housing 22. The housing 116 includes a rear chamber 117 which receives juice flowing along bottom wall 35. From chamber 117, juice flows into a forward chamber 118 in which may be provided a frusto-conical shaped hollow sieve 119 of any suitable mesh. Within the frusto-conical sieve 119 is a pair of paddles 120 having an outer edge tapered to correspond with the inclination of the frusto-conical sieve. Each paddle 120 may be slightly curved in a longitudinal direction to urge forward flow and advancement of pulp accumulated within the sieve. The paddles 120 may be suitably mounted on a shaft 121 which extends rearwardly and may be journaled as at 122 in the bottom wall of housing 22. Adjacent the journaling at 122, shaft 121 carries a spur gear 123 which meshes with a driving gear 124 carried on the extremity of motor shaft 39.

The housing 118 is provided with a bottom recess 125 for receiving juice processed through sieve 119. An outlet port 126 is provided for recess 125 and suitable valve means (not shown) may be connected to outlet 126 for dispensing of the juice.

The housing 118 may be provided with a front removable cover 127 having an eccentric port 128 formed therein for discharge of pulp accumulated within the sieve 119. The discharge port 128 may be covered by an adjustable pivoted shutter 129 so arranged to regulate flow of pulp as desired.

It will thus be noted that the fruit juice extracting device described above provides a rotatable turret head capable of carrying any selected number of fruit holders. While only two fruit holders are illustrated on each turret head, it is understood that one or more fruit holders may be carried by each turret head. The angular spacing of the fruit holders on the turret heads provides for better load distribution on the motor because the fruit cutting operation by one set of cooperable fruit holders occurs at a point in their circular path which does not coincide with the reaming operation of another set of cooperable fruit holders. It should further be noted that the cam means for positioning the fruit holder as desired during its circular path is adaptable for any selected number of fruit holders.

In Figs. 15, 16, and 17 is illustrated a different arrangement of the spherical reamers and fruit holders. In this modification the driving means differs in that motor shaft 39' is provided with a pair of spaced gears 150, each having engagement with a gear 151 carried on the inner end of a reamer shaft portion 43'. The axes of the reamer shaft portions 43' lie in laterally spaced apart relation in parallel planes and may be oppositely inclined to lie parallel to oppositely inclined primary axes 24'. A generally spherical reamer 27' is carried at the end of each shaft portion 43' at a position adjacent to the circular path of fruit holders 25'.

Each fruit holder 25' is carried by a spindle as in the prior modification except that in this modification the axis of the spindle passes through a point of tangency of the inner surface of the fruit receiving portion 77' at the intersection of the central or polar radius of the holder 25'. The plane defined by the circular edge of the fruit receiving portion 77' of the holder lies virtually parallel to the secondary axis.

As a result of this arrangement, a half fruit is held within the holder after the cutting operation by sliding contact of the edges of the portion 77' with the smooth uninterrupted surface 96'. The holding means of the prior modification, that is, the resilient fingers and pin, may be omitted.

To retain a half fruit in portion 77' as the holder approaches the reamer, surface 96' is extended slightly beyond the vertical bottom center of the circular path of the holder as at 152 so that the half fruit will lay back in the portion 77' as the holder begins to turn into its approach position to the reamer. Since the reamers 43' are spaced apart with respect to their relative positions to the circular paths of the holders, the reaming operations of the fruit holders are sequentially performed, thus reducing loading of the motor because only one half fruit is reamed at one instant. The angular relationship of the cutting means 90', the reamers 27' and the spacing of the holders 25' about the turret heads is such that each cutting operation and reaming operation is performed at a different instant of time to more uniformly load the motor.

In Fig. 19 is shown a different modification of an arrangement of reamer and fruit holder embodying this invention. In this modification the reamer shaft portions 43" are mounted with their axes extending downwardly and outwardly and suitably journalled in side walls of the casing. Each reamer shaft portion 43b may be spaced as illustrated in the modification shown in Figs. 16 and 17. A turret head 23" carries a fruit holder 25" by means of a spindle as above described. However, the fruit holder 25" is mounted on the spindle with the polar axis and plane of the open face thereof inclined in greater angular relationship than that illustrated in the first modification. This angular relationship is such that when the fruit holder is at mid position in the reaming operation, the plane of the open face of the holder will be perpendicular to the axis of the downwardly inclined reamer shaft portion.

It should be particularly noted that in this modification the fruit half is held by gravity within the fruit holder when at the lower portion of its circular path, because the fruit holder is arranged so that its open face is directed diagonally upwardly. Thus in the approach of the fruit holder to the reamer and during withdrawal thereof, the fruit half rests within the holder and is incapable of falling out of the holder.

In this modification the guiding surface for maintaining the fruit half within the holder between the fruit cutting operation and the reaming operation lies on a partially frusto-conical surface lying at an angle to the inclined plane of rotation of the spindle. The guiding surface thus provided terminates at a point on the circular path of the holder before the vertical bottom dead center is reached, as in the first modification, and where the rotation of the holder into a 45° approach position to the reamer will permit the holder to carry the fruit half by gravity.

The other parts of the modification shown in Fig. 19 may be substantially the same as those described in the prior two modifications. The important advantage of this latter modification is that a fruit half is positively held within the fruit holder without auxiliary means during that portion of its circular path concerned with the reaming operation.

The above described modifications illustrate the compactness of a fruit juice extracting device embodying this invention. The number of fruit holders carried by each turret head may be varied as desired so as to provide a device capable of extracting and producing finished fresh fruit juice in desired quantity. A maximum amount of juice is extracted from each fruit as a result of the particular, novel, and efficient arrangement of a spherical reamer and a fruit holder which is turned about a secondary axis, as above described, to press and wipe a fruit half over a major portion of the surface of the reamer. The novel arrangement of a cylindrical cam member and a cam follower eccentrically mounted with respect to the secondary axis provides for positive action of the fruit holder in assuming several different positions about the secondary axis to perform several operations in sequence while continuously traveling in its circular path.

It will thus be readily noted by those skilled in the art that a fruit juice extractor has been provided which, because of the sequential order of the operations to be performed, requires only a motor of low voltage, such as 110 volts, a power supply normally available in restaurants, drugstores, and the like. Display of this extractor is not detracted from by the splattering of juice against the transparent cover because of the effective deflector means which reduce splattering to a minimum.

It is understood that modifications and changes may be made in the extracting device described and shown above without departing from the spirit of this invention, and any and all such changes coming within the scope of the appended claims are embraced thereby.

I claim:

1. In a fruit juice extracting device, the combination of: a hollow, upstanding housing; a pair of rotatable turret heads mounted for rotation about oppositely inclined axes at opposed exterior sides of said housing; a plurality of open-faced, cup-shaped fruit holders carried by each head and normally facing said housing, means carried by the heads for selectively turning each holder about an axis lying in a plane perpendicular to said inclined axis; the fruit holders carried by each head describing a circular path lying in an inclined plane, the intersection of said inclined planes being above said housing; means on said housing for receiving a whole fruit below and adjacent to the intersection of said planes; knife means having a cutting edge disposed in a plane bisecting the angle of said inclined planes for cutting a whole fruit virtually half in two; means on said housing adjacent to the circular path of said holders for holding a half fruit within each fruit holder; a pair of spherical rotatable reamers exteriorly carried by the housing and positioned adjacent to the circular path of said fruit holders in unchanging relation to said paths for reaming a half fruit carried by each holder; said holder-turning means causing each holder to rapidly turn in a curved path about a major portion of the spherical face of the associated reamer; ejector means carried by the housing having ejector arms extending along a portion of the circular paths of the fruit holders for ejecting skin of the fruit from each holder after reaming; and driving means for rotating said reamers and said turret heads.

2. A device as described in claim 1 wherein the fruit holders carried by each turret head are angularly spaced apart differently from the angular relation of the reamer and knife means whereby spaced fruit holders carried by each head are ineffective to simultaneously perform a cutting and reaming operation.

3. A device as described in claim 1 wherein each fruit cup holder is provided with inwardly directed circumferentially spaced retaining elements adjacent to the open face of the holder for securing a fruit half within the holder, one of said retaining elements being of resilient material to yieldably hold and release a fruit half.

4. In a fruit juice extracting device, the provision of: a pair of angularly disposed primary shafts lying in the same plane; a turret head carried by each primary shaft for rotation about the axis of said shaft; a plurality of secondary shafts carried by each head and extending radially from said primary shaft; a fruit holder with an open face carried by each secondary shaft for rotation about the axis of the primary shaft in a circular path; a rotatable spherical reamer positioned adjacent to the circular path of each fruit holder for cooperation therewith in a fruit reaming operation; cam means carried within each head; a cam follower on each secondary shaft for cooperation with said cam means; said cam means and cam follower being arranged to selectively turn the open face of the fruit holder into and away from the direction of rotation of said holder in the circular path in a selected curve about said reamer; and driving means for rotating said spherical reamers and said primary shafts.

5. In a fruit juice extracting device, the combination of: reamer shaft portions extending outwardly from opposite sides of the device; a virtually spherical reamer carried at the outer end of each shaft portion; a pair of oppositely inclined primary shafts each spaced from said shaft portions, said primary shafts lying in the same plane; a secondary shaft supported from each primary shaft and rotatable about the axis of the primary shaft in an inclined plane; a fruit holder mounted on each secondary shaft to describe a circular path in said inclined plane and having a normally inwardly directed open face lying in a plane virtually parallel to the axis of the secondary shaft; cam means carried by each primary shaft cooperable with a cam follower on said secondary shaft for selective turning of the holder about the axis of the secondary shaft for reaming cooperation of the holder with the spherical reamer in a preselected curved path partially encompassing a major portion of said reamer, and driving means for said reamer shaft and primary shafts.

6. A device as defined in claim 5 wherein the reamer shaft portions lie with their axes in spaced parallel planes and inclined downwardly.

7. In an apparatus for reaming an object having an internal virtually hemispherical portion to be removed, the combination of: a rotatable virtually spherical reamer; cup-shaped holding means for the object to be reamed mounted for continuous rotation about a primary axis and for selected turning movement about a secondary axis angularly disposed to said primary axis; said holding means having a polar axis intersecting and angularly related to the secondary axis; and means selectively turning the holding means about said secondary axis into and away from the direction of rotation of the holding means in its rotation about the primary axis in a selected curve about said reamer to engage a major portion of the surface of the spherical reamer with the internal portion of the object to be reamed.

8. In an apparatus for continuously rotating a fruit holder having a partially spherical inner surface in a circular path about a primary axis and in a plane perpendicular thereto while selectively turning said holder about a secondary axis radially arranged to said primary axis and lying in said plane, the provision of: a rotatable spindle coaxial with said secondary axis and carrying said holder in virtually tangential relation to the spherical inner surface of the holder in spaced radial relation to the primary axis; and cam means for selectively turning said spindle, said cam means including a cylindrical cam member coaxial with said primary axis and a cam follower carried by said spindle in cooperable engagement with said cam member.

9. An apparatus as defined in claim 8 wherein said cam follower is eccentrically mounted on the spindle with respect to the secondary axis.

10. In an apparatus for continuously rotating a fruit holder in a circular path about a primary axis while selectively turning said holder about a secondary axis lying in the plane of said circular path, the provision of: cam means comprising a cylindrical cam member having a cam groove of uniform width formed in its outer cylindrical surface, said groove selectively and nonuniformly straddling the intersection of the plane of the circular path of the secondary axis with said primary axis and cam member; and a cam follower positioned eccentrically to said secondary axis for cooperable engagement with the cam groove.

11. In a fruit juice extracting device, the combination of: a housing; a driven reamer shaft extending outwardly from the housing; a spherical reamer carried on the outer end of the reamer shaft; a holder having a virtually semispherical recess for carrying a fruit half; means to pass said holder in a curvilinear path over and partially around said spherical reamer for extracting juice from a fruit half carried thereby comprising, a primary driven shaft spaced from the reamer shaft and extending outwardly from the housing, a secondary shaft angularly related to the primary shaft and carrying said holder at one end with the recess directed toward the housing; and means operatively connecting the other end of the secondary shaft to the primary shaft for selectively turning the holder about the axis of the secondary shaft to cause the recess to face said reamer at an angle upon approach thereto for initial extracting engagement of a fruit half with said reamer and to turn said holder partially around said reamer until the recess leaving the reamer in angular relationship thereto.

12. In a fruit juice extracting device, the combination of: a housing; a driven reamer shaft; a spherical reamer carried on the one end of the reamer shaft; a holder having a virtually semispherical recess for carrying a fruit half; means to pass said holder in a curvilinear path over and partially around said spherical reamer for extracting juice from a fruit half carried thereby comprising, a primary driven shaft spaced from the reamer shaft, a secondary shaft carrying said holder; and means operatively connecting the secondary shaft to the primary shaft for selectively turning the holder about the axis of the secondary shaft to cause the recess to face said reamer at an angle upon approach thereto for initial extracting engagement of a fruit half with said reamer and to turn said holder partially around said reamer until said holder is withdrawn therefrom with the recess leaving the reamer in angular relationship thereto.

13. A device as stated in claim 12 wherein the means connecting the primary shaft and secondary shaft include a cylindrical cam member on the primary shaft having a cam path and a cam follower eccentrically mounted on the secondary shaft and movable along said cam path.

14. A device as stated in claim 12 including resilient retaining means on the holder to secure a fruit half within said recess.

15. In an apparatus for reaming an object having an internal portion to be removed, the combination of: rotatable spherical reamers disposed on opposite sides of said apparatus; cup-shaped holding means for the object to be reamed each mounted for continuous rotation about a secondary axis angularly disposed to said primary axis, each holding means having a polar axis angularly related to said secondary axis; and means selectively turning each holding means about said secondary axis into and away from the direction of rotation of the holding means in its rotation about the primary axis in a selected curve about one of said reamers to engage a major portion of the surface of said reamer with the internal portion of the object to be reamed.

16. In an apparatus as stated in claim 15 wherein said reamers are located at non-corresponding points in the path of rotation of said holding means whereby only one object is being reamed at one time.

References Cited in the file of this patent

UNITED STATES PATENTS

| | | |
|---|---|---|
| 1,399,080 | Ross | Dec. 6, 1921 |
| 1,620,551 | Hughes | Mar. 8, 1927 |
| 1,764,158 | Edwards | June 17, 1930 |
| 2,078,737 | Segovia | Apr. 27, 1937 |
| 2,130,610 | Brown | Sept. 20, 1938 |
| 2,313,318 | Braun | Mar. 9, 1943 |
| 2,428,157 | Healy | Sept. 30, 1947 |
| 2,540,772 | Woodruff | Feb. 6, 1951 |
| 2,602,479 | Trainor | July 8, 1952 |

FOREIGN PATENTS

| | | |
|---|---|---|
| 117,683 | Australia | Nov. 11, 1943 |